U. T. STEWART, OF FAYETTE COUNTY, TENNESSEE.

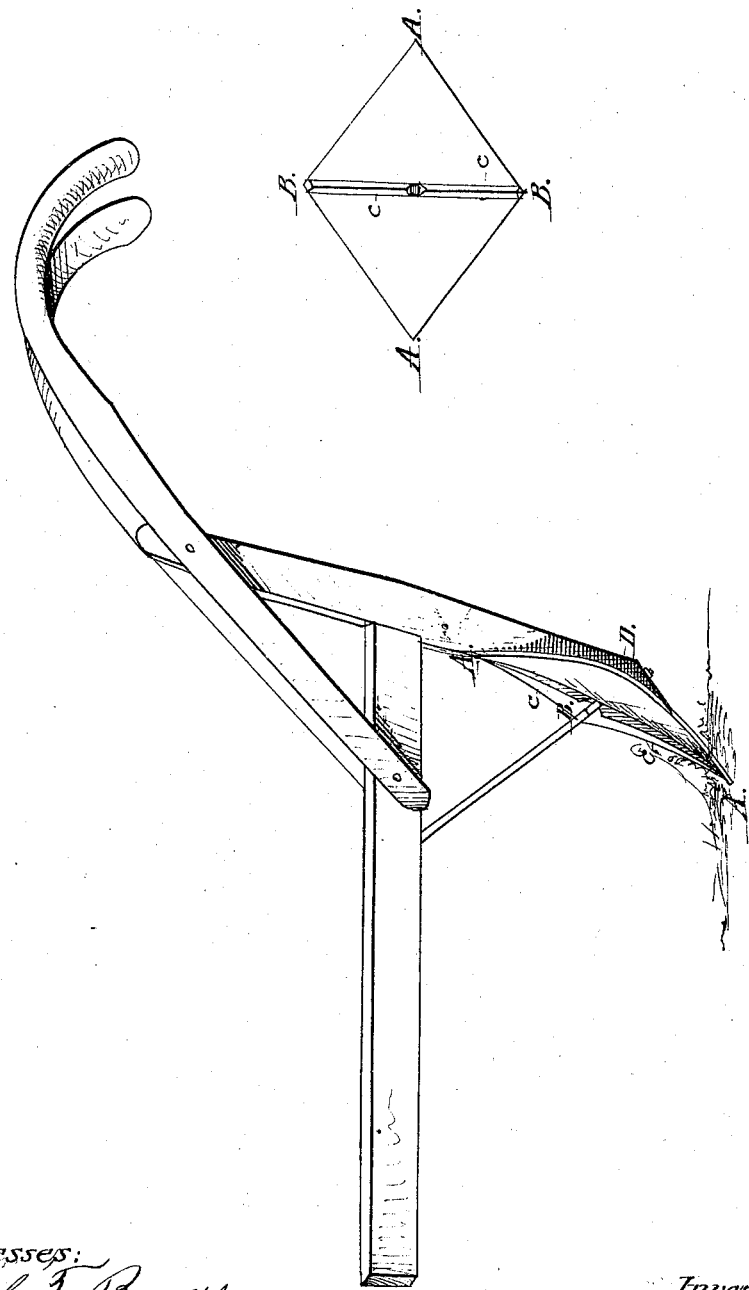

Letters Patent No. 88,344, dated March 30, 1869.

IMPROVEMENT IN SHOVEL-PLOWS.

The Schedule referred to in these Letters Patent and making part of the same.

*To all whom it may concern:*

Be it known that I, U. T. STEWART, of Fayette county, in the State of Tennessee, have invented a new and useful Improvement on a Four-Pointed Shovel-Plow, for the purpose of cultivating cotton, corn, or any other grain.

To enable others to make and use my invention, I proceed to describe its construction and operation.

This plow is so constructed that it revolves on its foot-piece D.

The plow is fastened by a rod, with a collar on it, passing through the centre of the plow and the foot-piece D; also fastened by a nut under foot-piece D.

This plow forms two sweeps, B B, and two shovels, A A.

This four-pointed plow sharpens itself, and revolves on its foot-piece, and forms those different points for use by turning the plow upside down.

*c* represents cutters, extending from the points toward the centre, or bolt, two on each side.

What I claim as my improvement, and desire to secure by Letters Patent, is—

The combination of four cutters, *c c c c*, attached to the centre of the plow, so as to cut the turf, or roots in front of the plow, constructed as described and shown.

U. T. STEWART.

Witnesses:
R. McC. KIRTLAND,
J. L. T. BOWERS.